(12) United States Patent
Vorsteher et al.

(10) Patent No.: US 6,896,121 B2
(45) Date of Patent: May 24, 2005

(54) CONVEYOR PAN

(75) Inventors: Dirk Vorsteher, Bielefeld (DE); Gerhard Merten, Lunen (DE); Frank Fischer, Lunen (DE); Jorg Wirtz, Hattingen (DE); Siefgried Schmidt, Bottrop (DE); Martin Broszat, Nordkirchen (DE); Alfred Hefferan, Venetia, PA (US); John Cobley, Farnsfield (GB); Alister McAndrew, Belper (GB); Olaf Losbrodt, Herne (DE)

(73) Assignee: DBT GmbH, Lunen (DE)

( * ) Notice: Subject to any disclaimer, the term of this patent is extended or adjusted under 35 U.S.C. 154(b) by 0 days.

(21) Appl. No.: 10/438,593

(22) Filed: May 15, 2003

(65) Prior Publication Data

US 2003/0213677 A1 Nov. 20, 2003

(30) Foreign Application Priority Data

May 17, 2002 (DE) ......................................... 102 22 599

(51) Int. Cl.⁷ ............................................... B65G 19/18
(52) U.S. Cl. ................................. 198/735.2; 198/735.4; 198/735.1; 198/725
(58) Field of Search ............................ 198/735.2, 735.4, 198/735.1, 725

(56) References Cited

U.S. PATENT DOCUMENTS

| 3,617,092 A | | 11/1971 | Kohler |
| 4,026,407 A | * | 5/1977 | Georg ...................... 198/735.1 |
| 4,245,736 A | * | 1/1981 | Hauschopp et al. ...... 198/735.1 |
| 4,281,759 A | * | 8/1981 | Pentith ........................ 198/598 |
| 4,359,154 A | * | 11/1982 | Temme .................... 198/735.2 |
| 4,363,398 A | * | 12/1982 | Temme .................... 198/735.4 |
| 4,391,471 A | * | 7/1983 | Hauschopp et al. .......... 299/43 |
| 4,422,542 A | * | 12/1983 | Temme et al. ........... 198/735.1 |
| 4,484,677 A | * | 11/1984 | Berwald ................... 198/735.1 |
| 4,607,890 A | * | 8/1986 | Merten et al. ................. 299/43 |
| 4,643,296 A | | 2/1987 | Braun et al. |
| 5,131,724 A | | 7/1992 | Bandy, Jr. et al. |
| 5,267,640 A | * | 12/1993 | Kerklies et al. ............ 198/607 |
| 5,700,061 A | | 12/1997 | Merten et al. |
| 5,871,261 A | * | 2/1999 | Bandy et al. ................. 299/43 |
| 6,131,724 A | * | 10/2000 | Hirasawatu et al. ........ 198/681 |
| 6,401,912 B1 | * | 6/2002 | Bandy, Jr. ................ 198/735.4 |

FOREIGN PATENT DOCUMENTS

| DE | 33 48 328 C2 | 1/1985 |
| DE | 33 36 518 A1 | 4/1985 |
| DE | 35 16 124 A1 | 11/1986 |
| DE | 39 05 324 A1 | 8/1990 |
| DE | 93 01 185 | 5/1993 |
| FR | 1.376.643 | 10/1964 |
| GB | 2 095 195 A | 9/1982 |
| GB | 2 228 244 A | 8/1990 |
| GB | 2 241 482 A | 9/1991 |

* cited by examiner

Primary Examiner—Eileen D Lillis
Assistant Examiner—Rashmi Sharma
(74) Attorney, Agent, or Firm—Cook, Alex, McFarron, Manzo, Cummings & Mehler, Ltd.

(57) ABSTRACT

The present invention relates to a conveyor pan (50) for underground face and gate conveyors, with a bottom pan (2) and a top pan (3) for the guidance of scrapers of a scrapper chain, the conveyor pan (50) having a welded frame construction (1) comprising side walls firmly fixed to one another with a conveyor base (8) and a means (60) of joining the conveyor pans. In accordance with the present invention the side walls comprise mirror image single part rolled profiles (10) with a constant profile form over the length of the conveyor pan (50), whereby the rolled profile (10) includes a base arm (11) and a top arm (12) both angled outwards as well as an extended intermediate arm (13) joining these, which is provided with an offset (14), onto which intermediate arm (13) on its inside at least one step (17) is formed for the support and welding on of at least one of the intermediate plates (40A) stiffening the frame construction (1).

29 Claims, 4 Drawing Sheets

CONVEYOR PAN

The present invention relates to a conveyor pan for underground face and gate conveyors, with a bottom pan and a top pan for the guidance of scrapers of a scraper chain, the conveyor pan having a welded framework construction, comprising side walls firmly fixed one to the other, a conveyor base and a means of joining the conveyor pans.

In previously proposed underground extraction installations such as for instance underground mining operations, chain scraper conveyors with large overall length come into application, which are put together from individual conveyor pans joined together in tension. The connection of the ad adjacent conveyor parts which are joined to each other is effected for instance using toggle pockets arid toggles, which permit a certain angular mobility in the horizontal arid the vertical axes of the adjacent conveyor pans, so that the chain scraper conveyor can smooth out unevennesses in the ground and can move together with the advance of the extraction front. Where the conveyor pans are applied for face conveyors they are provided on the spoil side and/or on the extraction side with built on parts for the guidance of for instance an extraction plough or a shearer loader and have connecting brackets for an advancing beam abutting the mining face. Owing to improvements in the mining performance of extraction machines and the increase of the face lengths in the meantime up to 450 m the conveyor performance to be provided by the conveyors increases similarly and modern face and gate conveyors must be able to cope with conveyor capacities of at least 2000 t/h (tonnes/hour) with high performance conveyors even of 5000 t/h. With increasing conveyor capacity the wear on the individual conveyor pans necessarily must increase and in the market there is a need fur conveyor pans with a higher conveying capacity and longer lifetime with the lowest possible production costs and the lowest overall weight for the individual conveyor pans Previously proposed underground face and gate conveyors can be divided into three groups according to the construction of the conveyor pans. The first group includes conveyors with completely cast conveyor pans. The advantage of such cast construction lies in its high reproducibility, high loading capability because of their homogeneous construction and their low liability to assembly failures. Disadvantages include high material costs, low adaptability for the design of individual zones for higher loading or longer lifetime and the lack of the possibility of replacing worn parts.

The second group is formed from so-called hybrid pans, which on the one hand comprise cast parts and on the other hand roiled parts. A hybrid pans of this construction is proposed in EP 525 926 B1. Hybrid pans can be made with a small number of welded joints, since for instance the entire construction of the side cheeks including the side profile for the guidance of the scraper in the trays and the toggle pockets as a part of connecting means of the conveyor pans can be formed in one piece whilst the conveyor base is welded on to the cast side cheeks as ore of the highly loaded parts. Furthermore, it is known that in hybrid pans the means for joining the conveyor pans and other built-on parts for the movement of the conveyor or for the guidance of an extraction machine can be welded on retrospectively is proposed in DE 39 05 324 A1.

The third group of conveyor pans comprises completely or almost completely a welded construction whereby at least the more highly loaded components such as the conveyor base and/or the side profiles comprise rolled profiles and thereby have a significantly longer lifetime and a lower liability Lo wear as is proposed in DE 29 18 007 A1, DE-PS 974 612, DE 393 38 84 C2 and DE 400 61 83 C2.

An advantage of welded conveyor pans lies in the fact that by the selection of different materials and manufacturing processes for the individual parts of the welded construction, a longer lifetime can be achieved for the conveyor pans. Faults affecting the dimensional stability of individual parts of the welded construction can be evened out during the assembly process, i.e. in the addition of the welded connections. Disadvantages of welded conveyor pans have included personnel dependent manufacturing costs owing to the multiplicity of assembly stages and welded connections to be undertaken, the danger of faults or cracks forming in the welded connections and the high tool costs for the tools required for the rolling of the profile parts. The conveyor pans in the third group detailed above can hold their own in the market since by the exchange of worn out parts at comparatively favorable costs, the entire functional capability of the conveyor can be restored. The top tray comes especially into consideration as an exchangeable part, which can be constructed as an exchangeable tray.

It is an aim of the invention to produce a conveyor pan which offers the advantages of welded construction and at the same time avoids the disadvantages of the previous construction of conveyor pans, and which conveyor pan, in particular owing to its form of construction, can be produced cost effectively, with low overall weight and with fewer assembly stages than previous conveyor pans.

Accordingly the present invention is directed to a conveyor pan as described in the opening paragraph of the present specification wherein the side walls comprise mirror image single part rolled profiles with a constant profile form over the length of the conveyor pan, whereby the rolled profile includes a base arm and a top arm both angled outwards as well as an extended intermediate arm joining these, which is provided with an offset onto which intermediate arm on its inside at least one step is formed for the support and welding on of at least one intermediate plate for stiffening the frame construction. In accordance with the invention the side walls are consequently formed from an almost U-shaped rolled profile with an asymmetrical profile form extending essentially over the entire height of the conveyor pan. The profile form is hereby, owing to the offset, adapted for the acceptance of functional and built-on parts at least in part in a positive engagement, so that owing to the special shape of the profile of the rolled profile, the required assembly stages for the built-on parts is eased and the attachment of the welded joints is favoured by the shape of the profile of the rolled profile. The stiffening of the frame of the construction is effected somewhat centrally between the top pan and the bottom pan, however by means of an additional intermediate plate not forming the conveyor base.

In a preferred embodiment the intermediate arm of the rolled profile is provided on its inside with a second, upper step for the support of the conveyor base, whereby an upper, top surface of the offset forms the second step. Owing to these measures, the conveyor base and all the forces in the vertical direction are not supported by the intermediate sheet but by means of the steps within the rolled profiles.

Advantageously the upper intermediate arm section above the upper offset is displaced outwards by more than a thickness of a wall of the intermediate arm section, so that a large area lateral support of the conveyor base can be achieved.

Preferably an inner side of the lower intermediate arm section of the rolled profile below the lower step, forms side walls of the bottom pan and the upper intermediate arm section above the offset limits on its inside, acceptance for the side pan constructed as an exchangeable tray. If the side walls of the bottom pan are integrated into the rolled profile the overall weight of the conveyor pan falls substantially. Since in the bottom pan as a rule no conveyed material or no coal is conveyed, this measure has no disadvantageous effect on the overall lifetime of the conveyor pan. Preferably the exchangeable tray comprises two rolled essentially L-shaped, angled or T-shaped side profiles which are matched to a profile shape of a scraper and a conveyor base welded to these rolled profiles of the top pan.

Advantageously a profile shape for the rolled profile is that the wall thickness of the lower intermediate arm section is essentially the same as that of the upper intermediate arm section and is smaller than wall thickness of the base arm and the top arm which are formed as one part with the intermediate arm. In a preferred embodiment, the rolled profile is provided in the region of the offset with an accumulation of material stiffening the steps and immediately above the offset, the wall has the least wall thickness. All the forces from the exchangeable tray can therefore safely be introduced into tile rolled profile. Preferably, the conveyor base extends slightly over the side profile of the top pan, so that sufficient surface is available for the application of the welded joint between the conveyor base of the exchangeable tray and its side profiles. Advantageously the top arm of the rolled profile is chamfered at a right angle to the upper intermediate arm section and a rib is formed on the inside of the upper intermediate arm section at a height of the top arm which in the assembled condition forms a sole abutment surface and side fixing for the exchangeable tray.

Preferably the lower intermediate arm section and the base arm form and border a recess for positive support and acceptance of corresponding protrusions on a means for connecting the conveyor pans and for example, for a connecting bracket for an advancing beam. The acceptance in positive engagement and matching of the means for connecting the conveyor pans and the connecting brackets does not only have production engineering advantages but after its assembly and welding in the rolled profile above the offset is additionally supported so that it can accept higher forces and loads exerted by an extraction machine guided on the conveyor pan. Preferably the intermediate arm is provided on its outer side in the region of the offset with an incline of between 45°–60°.

For the simplification and ease of assembly of the conveyor pan advantageously the rolled profile has a nose positioned on the inside of the lower intermediate arm section, at the height of the base arm. This nose provides support for and allows the welding on of a base sheet forming the bottom pan base. This simplifies and eases assembly of the conveyor pan. The two noses on the facing inner sides of the rolled profiles form at once a positioning aid for the base sheet and can serve as a welding bath securing means for a continuous welding seam joining the front ends of the base sheet with the rolled profiles. Preferably, edge rails of the base sheet of the bottom pan base are angled to correspond with the profile of the scraper of the scraper chain and wedge shaped stiffening sheets are welded on below the base sheet and onto the rolled profile for the additional support of the bottom pan base. This embodiment may occur if separate side profiles are dispensed with in the bottom pan and the guidance of the scraper on the side is effected by means of the lower intermediate arm sections of the rolled profile. Preferably the base arm is angled relative to the lower intermediate arm section by more than 90°. In a preferred embodiment, this angle will be 94°±2°. In an advantageous embodiment the base arm extends outwards beyond the top arm and passes in a single piece into a base rail section. Preferably the base arm extends via a step displacement, into the base rail section in a preferred embodiment the base arm and the top arm end on a vertical line. Advantageously an additional rolled profile length is welded on to the base rail section. The multi part construction of the base section eases the rolling of the rolled profile forming the side cheeks and facilitates an improved minimising of weight and an optimising of the rolled profile. Preferably, the base arm of the rolled profile ends in an almost L-shaped thickening of the arm forming an abutment foot on a ground surface. The thickening of the arm makes it possible that in the use of the conveyor pan as a face conveyor, base rails, sheets or similar can be welded on at different heights on the mining side and the spoil side.

In a preferred embodiment two parallel strips of sheet metal arranged alongside each other allow a free opening between them and form an intermediate sheet. This sheen which is welded on the lower step of the offset of the rolled profile. The opening between the two sheet strips reduces the overall weight of the conveyor pan and at the same time makes it possible that following disassembly of an exchangeable tray or an exchangeable tray made as an inspection tray, an inspection opening is present for the bottom pan. In an advantageous embodiment, T-shaped side profiles of the exchangeable tray are provided with side horizontal arms which are welded with the top arms of the rolled profile of the conveyor pan. Preferably, a continuous long welded joint is used as a retaining means for the exchangeable tray. Advantageously the top arm of the rolled profile extends outwards further than the horizontal arm of the side profile of the exchangeable tray. Preferably the side profile can be L-shaped and is welded using a single continuous long welded joint in the gap between the side profile and the top arm to the latter with the horizontal arm extending inwards on the upper side so it can connect in a binding manner with the top arm of the rolled profile. In a preferred embodiment, for the disassembly of the exchangeable tray the long welded joint is separated by machine. By the firm welding on the exchangeable tray to the top arm of the rolled profile, the disadvantages, which exist in removable fastening means for exchangeable trays are reduced. Owing to the constant construction over the length of the conveyor pan and the rolled profile and also the side profiles of the exchangeable trays not only is an automated machine welding and assembly of individual conveyor pans possible, but also the separation of the welded joints for exchanging an exchangeable tray can be effected by machine. Preferably the metal strips forming the intermediate sheet or the conveyor base are provided at their ends with arc shaped edges produced by flame cutting, whereby the curved profile of the one edge is formed complimentary to the curved profile of the other edge. In a preferred embodiment an exchangeable tray as an inspection tray, comprises three identical tray sections each having a conveyor base section and two essentially T-shaped side profile sections, whereby the outer edge surfaces of the horizontal arms of the side profile sections are welded to the upper side of the top arm of the rolled profile using long weld joints and a centre tray section is retained on the two other tray sections and on the rolled profiles forming the side walls. Preferably the conveyor base sections of all the tray sections are provided with curved edges whereby the curve of the profile of one edge is complimentary in form to that of the other edge.

Advantageously one of the metal strips on the end of the conveyor pan extends out over both rolled profiles and the other strip is arranged set back from the end of the conveyor pan. With these measures overlapping arises at the abutment of the pans such that finer material cannot fall from the top pan into the bottom pan. In a preferred embodiment, in a welded construction of the conveyor pans the connecting means for the conveyor plans comprises forged toggle pockets welded onto the rolled profiles in which toggle heads or toggle bolts can be inserted. As explained above the toggle pockets have protrusions which are matched to hollows below the offset and between the lower intermediate arm section and the base arm of the rolled profile and can engage positively in this hollow. Advantageously the welding on of the toggle pockets to the rolled profiles is effected such that the toggle pockets extend out over the rolled profile at one end of the conveyor pan and at the other end of the conveyor pan are arranged to be displaced backwards. Therefore the overlapping of the toggle pockets at the joint of the conveyor pans between two adjacent conveyor pans avoids fatigue wear or breakouts at the face ends of the rolled profiles and/or of the conveyor base.

In a preferred embodiment, an angled guide plate is welded between end edges of the base rail section as a static loading ramp.

Preferably, parallel displacement of the lower intermediate arm section from the upper intermediate arm section is approximately 35 mm±2 mm larger than the thickness of the wall of the vertical arm of the side profiles of the exchangeable tray. A sufficient thickness for abrasion and wear of several mm, for instance 15 mm can be taken into account. Advantageously the width of the opening of the rolled profiles between the top arm and the bottom arm tapers towards the intermediate arm. This would occur when the top arm and the bottom arm merge into the intermediate arm section with arm increasing cross-section.

Examples of conveyor pans made in accordance with the present invention will now be explained with reference to the accompanying drawings, in which.

Figure 1:
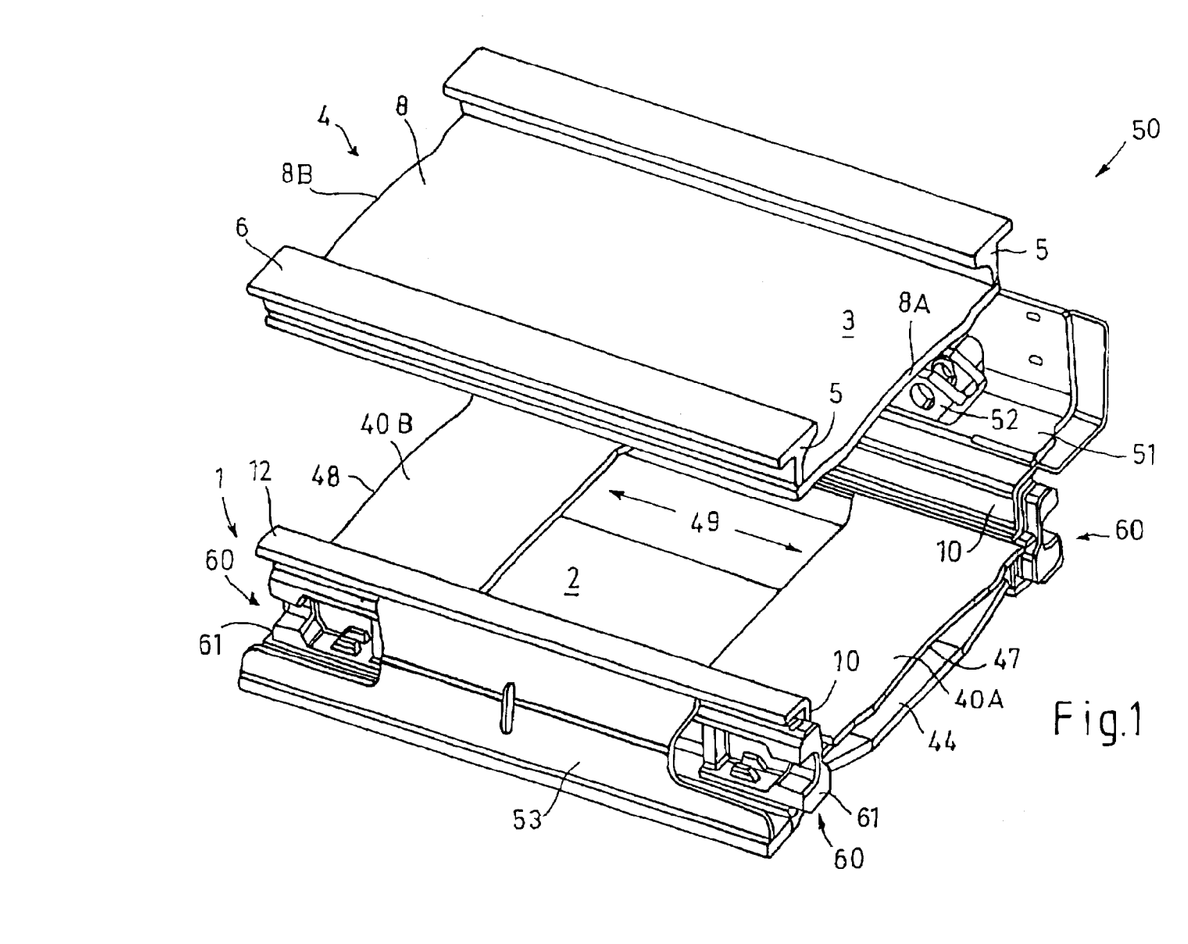
FIG. 1 shows a perspective view of a conveyor pan in accordance with a first embodiment with the exchangeable tray lifted out.
Figure 2:
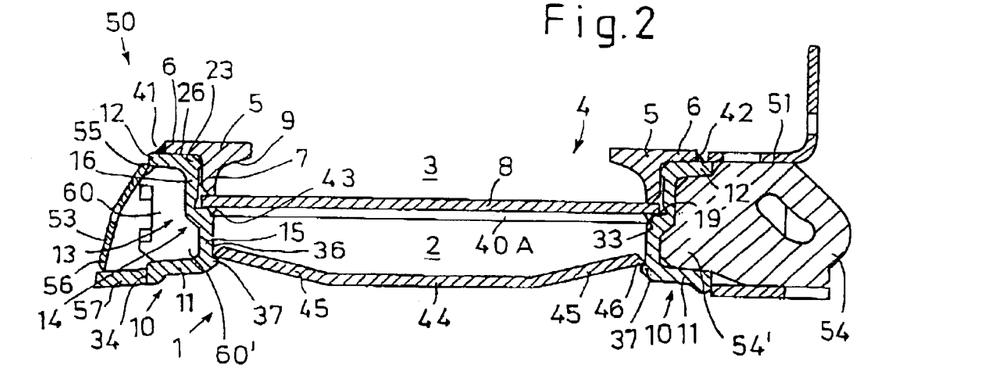
FIG. 2 shows a cross-sectional view through a conveyor pan according to the first embodiment with the exchangeable tray assembled.

A conveyor pan 50 is shown in FIG. 1 and FIG. 2 has a framework construction 1 forming the bottom pan 2 and an exchangeably constructed exchangeable tray 4 forming the top pan 3 supported on the framework construction 1. the exchangeable tray 4 comprises a welded construction of two mirror image side profiles 5 comprising somewhat T-shaped rolled profiles, which each comprise a horizontal web 6 and a vertical web 7 which are welded by means of a welded seam, not shown, at the foot of the vertical web 7 to a conveyor base 8 comprising a rolled sheet. The conveyor base 8 extends by a small amount to the side out over the vertical web 7 of the side profile 5 so that a welded joint can be applied by machine between the vertical web 7 and the conveyor base 8. The inner flank 9 of the side profile 5 facing the top pan 3 and the conveyor base 8 is provided with a wear resistant profile contour matched to a scraper (not shown) of a scraper chain circulating around the bottom pan 2 and the top pan 3.

The frame construction 1 of the conveyor pan 50 includes two identically formed asymmetrical rolled profiles 10, mirror imaged to each other, manufactured by profile rolling with a somewhat U-shaped profile form, which form the side walls of the conveyor pan 50. The construction of the rolled profiles 10 is now explained with reference to FIG. 3.

Figure 3:
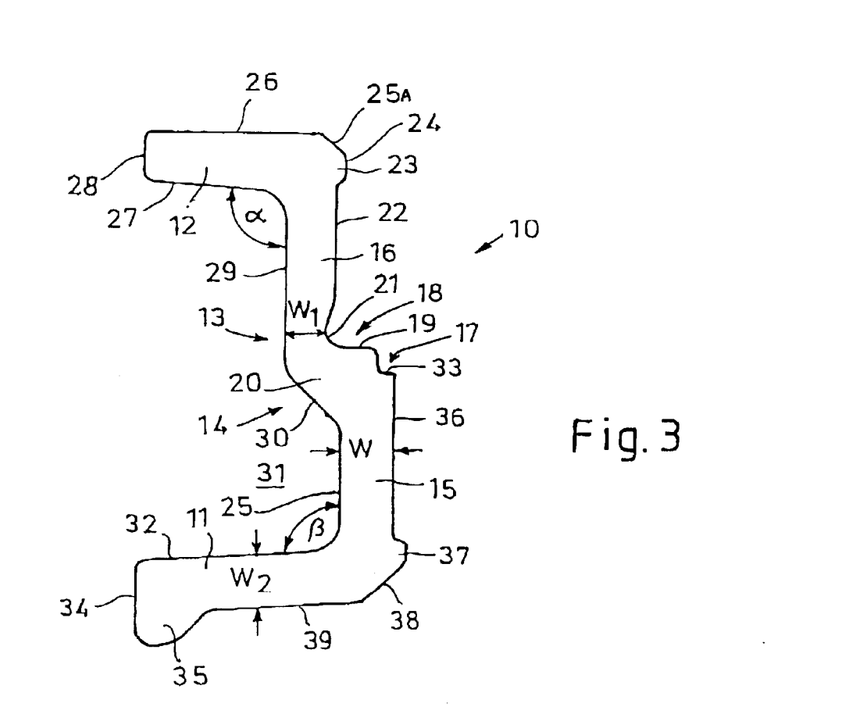
FIG. 3 shows a cross-sectional view of a rolled profile in accordance with the first embodiment.

The single part rolled profile 10 comprises a base arm 11, a top arm 12 and an intermediate arm 13 joining these two together, which has somewhat centrally an offset 14, which divides the intermediate arm 13 into a lower intermediate arm section 15 and an upper intermediate arm section 16. Owing to the offset 14 the upper intermediate arm section 16 is displaced as opposed to the lower intermediate arm section 15 by more than the wall thickness W of the lower intermediate arm section 15 towards the outside and parallel to it, whereby here under "towards the outside" a displacement or an angling towards the outer side of the assembled conveyor pan is implied, whilst inner or towards the inside designates the sides facing the two pans 2, 3. The base arm 11 and the top arm 12 are correspondingly angled towards the outside relative to the lower intermediate arm section 15 and the upper intermediate arm section 16. The offset 14 of the intermediate arm 13 is provided on its inside with a lower step 17 and an upper step 18, whereby the upper step 18 coincides with the upper side 19 of the offset 14 and has an essentially greater breadth than the horizontal supporting surface 33 of stop 17. Both steps 17, 18 are supported on the underside by the material accumulation 20 in the region of the offset 14 and are vertically aligned over the lower intermediate arm section 15 so that the forces and loadings introduced into the steps 17, 18 can be accepted in the strong lower intermediate arm section 15 without moment. The top surface 19 of the upper step 18 ends in a radius 21, which is moulded to the inner side 22 of the upper intermediate arm section 16 so that the rolled profile 10 has its least wall thickness $W_1$ in the region of the radius 21. The inner side 22 of the upper intermediate arm section 16 has a rib 23 at the height of the top arm 12, whose inside end surface 24 is aligned vertically with the outer side 25 of the lower intermediate arm section 15 and extends some 5 mm over the inner side 22 of the upper intermediate arm section 16. The end surface 24 of the rib 23 makes the transition via an intermediate incline 25A to the horizontal tipper side 26 directed at right angles to the inner side 22 of the top arm 12 angled outwards. The top arm 12 hereby broadens out, starting from its outer end surface 28 to the intermediate arm 13 so that the underside 27 of the top arm 12 includes an angle α of about 94° with the outer side 29 of the upper intermediate arm section 16. In the curved section between the top arm 12 and the upper intermediate arm section 16 the rolled profile 10 forms a thickening, which stabilizes and supports the top arm 12. The outer side 29 of the upper intermediate arm section 16 passes via an incline 30 arranged at an angle of about 45° into the outer side 25 of the lower intermediate arm section 15, whereby the incline 30 forms the outer wall of the offset 14 and the material accumulation 20. Owing to the offset 14 and the displacement between the lower intermediate arm section 15 and the upper intermediate arm section 16 there arises in the rolled profile 10 a hollow 31, which extends below the upper intermediate arm section 16 and which is bordered by the incline 30, the outer wall 25 of the lower intermediate arm section 15 and the upper wall 32 of the base arm 11. The upper wall 32 is hereby angled away by an angle β, which preferably amounts to 94° like the angle α, relative to the outer wall 25. The rolled profile 10 is constructed overall such that the horizontal supporting surface 33 of the step 17 is arranged exactly in the middle between the upper wall 32 of the base arm 11 and the lower side 27 of the top arm 12 and has a maximum distance of some 125 mm to both of these. The base arm 11 ends at its outer arm end 34 in an approximately L-shaped arm thickening to a swelling 35 with which the rolled profile 10 in the conveyor pan 50 (FIG. 1) can support itself on the ground, which separates the underside 39 of the base arm 11 from the ground. The outer arm end 34 makes a transition to the underside 39 of the base arm 11 via an S-shaped contour, round the swelling 35. An intermediate incline 38 connects to the underside 39 of the base arm 11, immediately above which a nose 37 is formed which forms the lower end of the inner wall 36 of the lower intermediate arm section 15 and onto which a base plate can be supported as the bottom run base, which will be explained later. The rolled profile 10 has preferably an overall height between the foot side of the arm thickening 35 and the upper side 26 of the top arm 12 of about 340 mm with a wall thickness $W_2$ in the base arm 11 of some 35 mm, a wall thickness W in the lower intermediate arm section 15 and in the upper intermediate arm section 16 of some 31 mm and 30 mm respectively and a minimum wall thickness $W_1$ in the region of the radius 21 immediately above the offset 14 of some 25 mm. All the transitions in the rolled profile 10 are radiused as dictated by the manufacture.

Reference is now made again to FIG. 1 and FIG. 2. The two side walls of the conveyor pan 50 formed from the rolled profile 10 according to FIG. 3 are stiffened by the two metal strips 40A, 40B whose side edges 43 each lie, on the supporting surface 33 of the lower step 17 (FIG. 3) of the rolled profile 10 and are there welded with a horizontally running welded joint applied by means of a welding automaton and/or welding robot. The height of the intermediate sheet 40, 40B is the same or only slightly smaller than the distance between the supporting surface 33 and the top surface 19 on the offset 14 so that the conveyor base 8 of the exchangeable tray 4 in its assembled condition can be supported on the top surface 19 of the upper step 18 in the region of the offset 14 of the rolled profile 10. As can further be seen from FIG. 2 the horizontal web 6 of the side profile 5 of the exchangeable tray 4 lies on the upper side 26 of the top arm 12 of the roiled profile 10 and is welded there using long seam welds 41, 42 on both sides, whereby the welded joint 42 could also be dispensed with Owing to the constant profile cross-section of the rolled profile 10 along the conveyor pan length and of the side profile 5 the welded joints 41, 42 can also be automated by means of a welding robot applied in a defined position. For the disassembly of the exchangeable tray 4 the welded seams 41, 42 can be separated, for instance milled out, so as to insert a new exchangeable tray 4 and by means of new welded seams 41, 42 welded to the rolled profile 10 forming the side walls. The positioning of the exchangeable tray 4 at right angles to the running direction of the scraper is effected exclusively by means of the end surfaces 24 of the ribs 23. The displacement between the lower intermediate arm section 15 and the upper intermediate arm section 16 in the rolled profile 10 is, as FIG. 2 shows clearly, selected such that in the assembled condition the profile contour 9 is aligned by the vertical web 7 of the side profile 5 with the inner surface 36 of the lower intermediate arm section 15, so that the clear distance between the two lower intermediate arm sections 15 of the individual rolled profiles 10 corresponds to the clear separation between the vertical webs 7 of the side profile 5 and the scraper can be guided with small surface friction both between the side limits of the bottom pan 2 formed by the lower intermediate arm sections 15 and also between the side profiles in the top pan 3. The bottom tray 2 has a base plate 44 with edge rails 45 angled upwards and matched to the profile shape of the scraper (not shown) whose rim edges 46 are supported on the noses 37 in the foot region of the lower intermediate arm section 15 and are welded by means of further not shown welded seams above the noses 37 which because of their linear direction can be applied from above in an automated manner using a welding robot. The noses 37 form at the same time a welding bath security for the welded seams.

The conveyor pan 50 shown in FIG. 1 and FIG. 2 is provided with attachments for application in a face conveyor. The rolled profile 10 shown in FIG. 1 at the rear and in FIG. 2 to the right forms in a face conveyor the spoil side, side wall onto which a side plate 51 is welded so as on the spoil side to be able to fasten a drive shaft, not shown, for a shearer loader using the holder 52 whilst an angled guide sheet 53 is welded onto the face side of the roiled profile 10 on the left as shown in FIG. 2 which serves as a static loading ramp for broken rock during the movement of the face conveyor and the conveyor pans 50. The movement of the conveyor pan 50 and the face conveyor is effected by means of an advancing beam, not shown, engaging in the attachment bracket 54 mounted on the spoil side, abutting an extension, not shown. The guide plate 53 is joined by a welded seam, not shown, on its upper edge 55 to the top arm 12 of the rolled profile 10, especially with its outer top surface 28 and on its lower educe 56 with a ground beam 57 formed from a rolled profile rod which is welded onto the outer side 34 of the base arm 11.

In order to construct a face or gate conveyor with the conveyor pans 50 according to an embodiment of the invention, on both the rolled profiles 10 close to the opposing conveyor pan ends, preferably forged toggle pockets 60 are welded in, which as is easily seen from FIG. 2 are provided with a protrusion 60' which engages positively in the hollow (31, FIG. 3) in the rolled profile 10 and engages beneath the offset 14 of the rolled profile 10 so as additionally to support the upper intermediate arm section 16. On one of the two ends of the conveyor pans the two toggle pockets 60 extend out from the two rolled profiles 10 by a few centimeters as is easily seen on the right in FIG. 1, whilst on the other end of the conveyor pan (on the left in FIG. 1) the two toggle sockets 60 are set back, so that when two adjacently adjacent conveyor pans 50 are assembled together the front edges 61 of two toggle pockets 60 abut immediately onto each other. For the fastening of two conveyor pans toggle bolts, not shown, are inserted into the toggle pockets 60. The bracket 54 also has a profile contour with a protrusion 54' with which it engages positively into the hollow (31, FIG. 3) on the outer side of the lower intermediate arm section 15 of the spoil side rolled profile 10 and hereby engages below the offset 14. As with the toggle pockets 60 also in the assembly of the connecting bracket 54 its exact positioning is determined by the hollow in the side walls of the rolled profile 10 and the associated protrusion 54' on the connecting bracket 54.

Further to this FIG. 1 shows that a metal strip 40A extends out from the rolled profile 10 at one end of the conveyor pan, whilst the metal strip 403 at the rear end of the conveyor pan is set back correspondingly as opposed to the rolled profile 10. The end edge 47 of the metal strip 40A and the end edge 48 of the metal strip 40B are, as are the edges 8A, 8B of the conveyor base 8, manufactured by flame cutting in an arc shape, so that the scrapers pass comparatively noiselessly onto the following conveyor pan. The two metal strips 40A, 40B are welded onto the step 17, spaced apart from each other, so that between the inner edges of the metal strips 40A, 40B an opening is formed which, with the exchangeable tray 4 removed, can serve as an inspection opening for the bottom pan 2.

Figure 4:
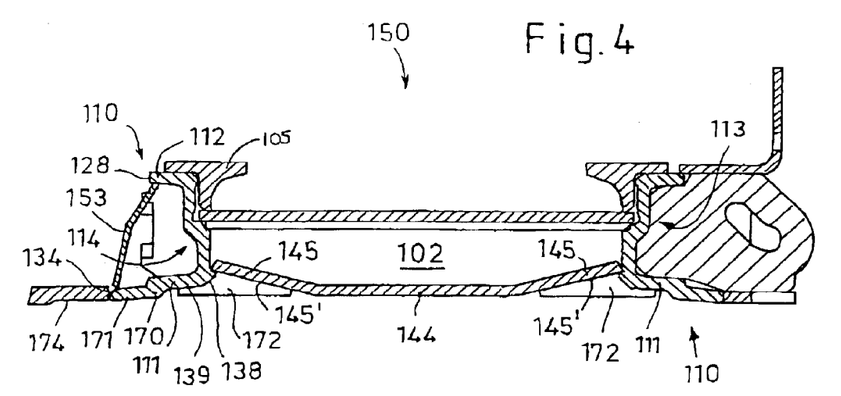
FIG. 4 shows a cross-sectional view through a conveyor pan with a rolled profile made in accordance with a second embodiment.

FIG. 4 shows a second embodiment of a conveyor pan 150 where similar parts are given similar reference symbols. The conveyor pan 150 according to FIG. 4 differs from the conveyor pan 50 according to FIG. 1 and FIG. 2 especially in the profile shape of the rolled profile 110 in the region of the base arm 111 whilst the intermediate arm 113 is made identically to the previous embodiment with the steps in the offset 14 so that to avoid repetition attention is drawn to the previous description; the base arm 111 has here instead of a thickening of the arm a stepped section 170 via which it makes the transition in a single piece into a base rail section 171. The end of the arm 134 of the base arm 111 therefore extends beyond the outer end surface 128 of the top arm 112 of the rolled profile 110 in the outward direction. Owing to the single piece construction of the base rail section 171 and the base arm 111 a welded joint can be dispensed with. In the conveyor pan 150 the base plate 144 forming the bottom pan base of the bottom pan 102 is engaged from below by several stiffening sheets 172 which are wedge shaped on their top side and flat on their bottom sides forming base ribs which are welded onto the undersides 145' of the angled edge rails 145 on the underside 139 of the base arm 111 and to the lower intermediate inclines 138. At the end of the arm 134 of the base rail section 171 a machine track 174 is welded on, onto which a shearer loader can be supported as an extraction machine in front of the conveyor pan and in front of the guide plate 153 on the spoil side.

Figure 5:
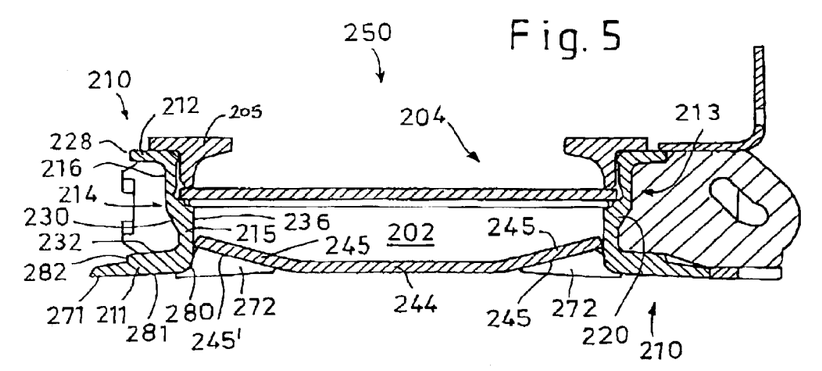
FIG. 5 shows a cross-sectional view through a conveyor pan with a rolled profile made in accordance with a third embodiment.

FIG. 5 shows a third embodiment of a conveyor pan 250. Here also similar parts are provided with reference figures increased again by 100. The exchangeable tray 204 is identical in construction to that in the first and second embodiments and the rolled profile 210 has the same construction and the same dimensions as in the embodiments according to the FIGS. 1 to 4 in the top arm 212 and in the upper intermediate arm section 216. The lower intermediate arm section 215 of the intermediate arm section 213 is flat on its inside 236 and makes the transition without a nose via a radius 280 with a comparatively large circular radius, to the base arm 211 which is flat on its underside 281 over the whole conveyor pan length and breadth of the rolled profile and ends as a single piece in the base rail section 271. On the upper side 232 of the base arm 211 on a vertical line from the outer face surface 228 of the top arm 212 a cut out 282 is formed; the base rail section 271 has a substantially smaller wall thickness than the base arm 211 on the inner side of the cut out 282. The base plate 244 forming the bottom pan base of the bottom pan 202 is again supported by means of several stiffening sheets 272 distributed over the length of the conveyor pan which are wedged shaped on their top sides and flat on their bottom sides, which are welded onto the under sides 245' of the angled edge rails 245 and in the region of the radiuses 280 on the lower arm sections 215 of the rolled profile 210. The offset 214 of the rolled profile 210 in the conveyor pan 250 has on its outer side an incline 230, which runs at an angle of about 60° more steeply than the incline in the conveyor pans 50 and 150 according to FIGS. 1 to 4. The material accumulation 220 with which the steps on the offset 214 are supported therefore falls away more strongly in the rolled profile 210, and the rolled profile 210, because of this thicker material accumulation and the stronger design of the base arm 211, can support especially favourably a shearer loader track fastened on the face side to the top arm 232.

Figure 6:
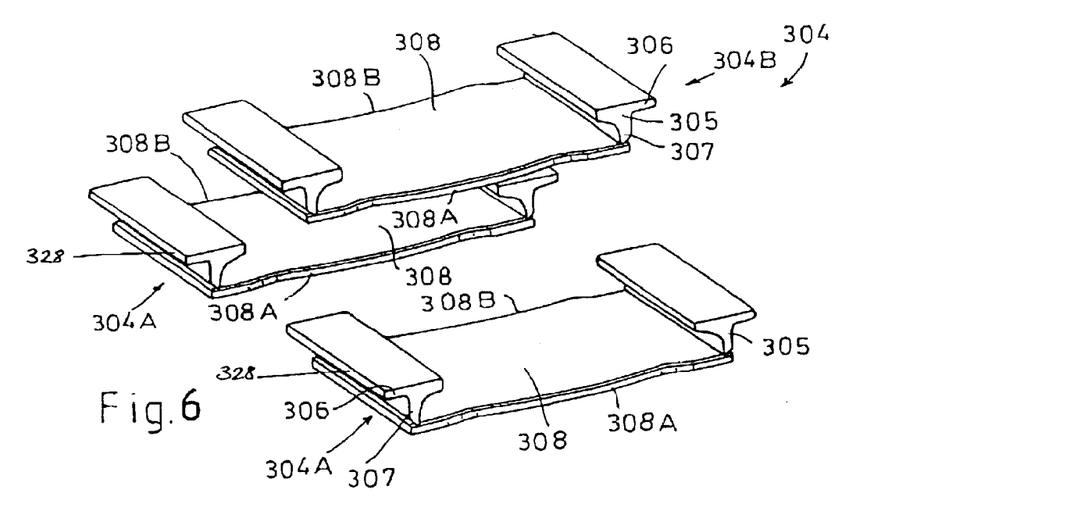
FIG. 6 shows a perspective view of an inspection tray formed in accordance with the present invention from three identical tray sections.
Figure 7:
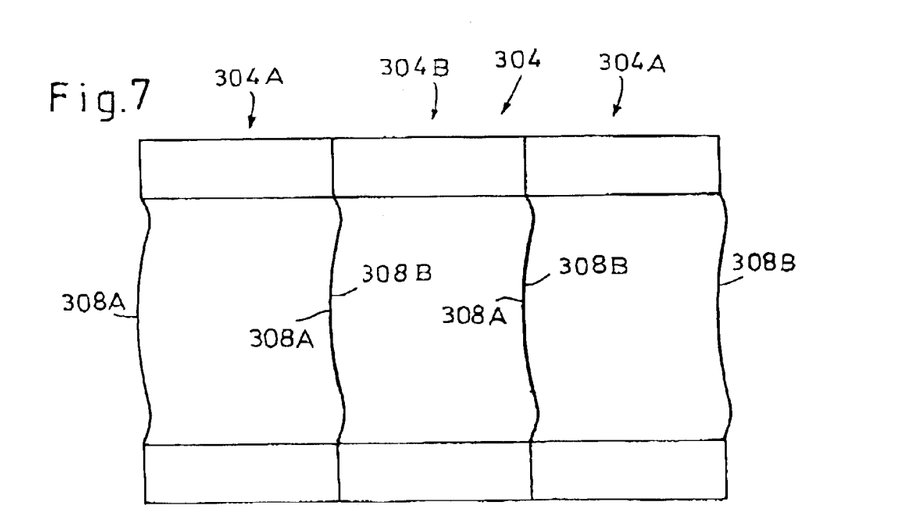
FIG. 7 shows a plan view of the inspection tray as shown in FIG. 6.

FIG. 6 and FIG. 7 show the preferred embodiment for an inspection tray formed as an exchangeable tray 304. It comprises three identically constructed tray sections 304A, 304B each with a conveyor base section 308 and two essentially T-shaped side profile sections 305 with vertical webs 307 and horizontal webs 306, which have identical profiles as the side profiles 5, 105, 205 of the other exchangeable trays. In the inspection tray the outside face surfaces 328 of the horizontal arm 306 of the side profile section 305 of the two outer tray sections 304A are welded using long welding seams to the upper side of the top arm of the rolled profile 10, 110 and 210 which extend over the length of the individual tray sections 304A. Tho centre tray section 304B on the other band is retained by means of removable tray fastening moans, not shown, onto the two other tray sections 304A and/or to the side walls formed by the rolled profiles 10, 110, 210 so that it can be removed for a short time for an inspection of the scraper chain in the bottom pan through the opening (49, FIG. 1) between the adjacent sheets. The conveyor base sections 308 of all the tray sections 304A, 304B are provided with curved edges 308A, 308B preferably manufactured by flame cutting, whereby the curve profile of the one edge 308A is complementary to the curved profile of the other edge 308B, as is particularly well seen in FIG. 7.

For a man skilled in the art a series of modifications arise from the foregoing descriptions, which fall within the scope of the attached claims. Especially regarding the profiling of the bottom arm and the profiling of the outer side of the offset, other intermediate forms are conceivable which can be manufactured by rolling. Furthermore a positive support of the toggle bolt pockets and the attachment brackets with simultaneous support of the upper intermediate arm section and the top arm of the rolled profile is possible. In all the embodiments according to the invention the side walls comprise a rolled profile which accepts the forces and loadings with an offset and the conveyor pans are formed from a lower number of preferably weighted optimised parts with few assembly stages. The side profiles of the exchangeable tray could be constructed differently from the embodiments shown, also L-shaped or angled. The intermediate sheet could also be formed as one piece even if the two part embodiment with two metal strips offers advantages both with regard to manufacturing costs and also with respect to the overall weight of the conveyor pan.

What is claimed is:

1. A conveyor pan for underground face and gate conveyors, with a bottom pan and a top pan for the guidance of scrapers of a scraper chain, the conveyor pan having a welded frame construction comprising side walls firmly fixed to one another, a conveyor base and a means of joining the conveyor pan, in which the side walls comprise mirror image single part rolled profiles with a constant profile form over the length of the conveyor pan, whereby the rolled profile comprises a base arm and a top arm both angled outwards as well as an extended intermediate arm adjoining the base arm and the top arm, the rolled profile which is provided with a vertical linear offset, onto which the extended intermediate arm on its inside at least one step is formed for the support and welding on of at least one intermediate plate for stiffening the frame construction, an upper intermediate arm section above the vertical linear offset is displaced outwards by more than a thickness equal to that of the side walls.

2. A conveyor pan according to claim 1, in which the intermediate arm of the rolled profile is provided on its inside with a second upper step whereby an upper top surface of the offset forms the second step.

3. A conveyor pan according to claim 1, in which an inner side of the lower intermediate arm section of the rolled profile below the lower step forms side walls of the bottom pan and the upper intermediate arm section above the offset limits on its inside acceptance for the top pan constructed as an exchangeable tray.

4. A conveyor pan according to claim 1, in which the exchangeable tray comprises two rolled essentially L-shaped or T-shaped side profiles, which are matched to a profile shape of a scraper, and a conveyor base welded to these.

5. A conveyor pan according to claim 1, in which the wall thickness of the lower intermediate arm section is essentially the same of that of the upper intermediate arm section and is smaller than the wall thickness of the base arm and of the top arm which are formed as one part with the intermediate arm.

6. A conveyor pan according to claim 1, in which the rolled profile is provided in the region of the offset with a material accumulation stiffening the steps.

7. A conveyor pan according to claim 1, in which the top arm of the rolled profile is chamfered at a right angle to the upper intermediate arm section and a rib is formed on the inside of the upper intermediate arm section at a height of the top arm.

8. A conveyor pan according to claim 1, in which the lower intermediate arm section and the base arm form and border a recess for positive support and acceptance of corresponding protrusions on a means for connecting the conveyor pans.

9. A conveyor pan according to claim 1, in which the intermediate arm is provided on its outer side in the region of the offset with an incline of between 45° or 60°.

10. A conveyor pan according to claim 1, in which the rolled profile has a nose positioned on the inside of the lower intermediate arm section preferably at the height of the bottom arm.

11. A conveyor pan according to claim 1, in which edge rails of the base sheet of the bottom pan are angled to correspond with the profile of the scraper of the scraper chain and stiffening sheets are welded on below the base sheet and onto the rolled profile for the additional support of the bottom pan base.

12. A conveyor pan according to claim 1, in which the base arm is angled relative to the lower intermediate arm section by more thank 90° angle.

13. A conveyor pan according to claim 1, in which the base arm passes in a single piece into a base rail section.

14. A conveyor pan according to claim 1, in which the base arm passes in a single piece into a base rail section.

15. A conveyor pan according to claim 1, in which the base arm and the top arm end on a substantially vertical line.

16. A conveyor pan according to claim 15, in which the base arm of the rolled profile ends in an almost L-shaped thickening of the arm forming an abutment foot on a ground surface.

17. A conveyor pan according to claim 1, in which two parallel strips of metal sheet arranged alongside each other allow a free opening between them and form an intermediate sheet.

18. A conveyor pan according to claim 1, in which T-shaped side profiles of the exchangeable tray are provided with horizontal webs which are welded to the top arms of the rolled profiles of the conveyor pan.

19. A conveyor pan according to claim 1, in which the exchangeable tray has L-shaped side profiles with vertical arms and horizontal arms which are welded via a single continuous long welded joint to the gap between the side profile and the top arm to the latter with the horizontal arm extending inwards on the upper side so it can connect in a binding manner with the top arm of the rolled profile.

20. A conveyor pan according to claim 18, in which the long welded joints are adapted for separation so as to allow removal of the exchangeable tray.

21. A conveyor pan according to claim 1, in which metal strips forming the intermediate sheet or the conveyor base are provided at their ends with are shaped edges produced by flame cutting, whereby the curved profile of one edge is formed complementary to the curved profile of the other edge.

22. A conveyor pan according to claim 1, in which the exchangeable tray is formed as an inspection tray comprises three identically constructed tray sections each having a conveyor base section and two essentially L- or T-shaped side profile sections, whereby the outer edge surfaces of the horizontal arms of the side profile sections are welded to the upper side of the top arm of the rolled profile using long welded joints and a centre tray section is retained on the two other tray sections and on the rolled profiles forming the side walls.

23. A conveyor pan according to claim 22, in which the conveyor base sections of all the tray sections are provided with curved edges, whereby the curve of the profile of one edge is complementary in form to that of the other edge.

24. A conveyor pan according to claim 17, in which one of the metal strips on the end of the conveyor pan extends out over both rolled profiles and the strip is arranged set back from the end of the conveyor pan.

25. A conveyor pan according to claim 1, in which the toggle pockets extend out over the rolled profiles at one end of the conveyor pan and at the other end of the conveyor pan are arranged to be displaced backwards.

26. A conveyor pan according to claim 1, in which an angled guide plate is welded between end edges of the base rail section as a static loading ramp.

27. A conveyor pan according to claim 1, in which a parallel displacement of the lower intermediate arm section from the upper intermediate arm section is greater than the wall thickness of the vertical arm of the side profile.

28. A conveyor pan according to claim 1, in which the width of the opening of the rolled profile between the top arm and the bottom arm tapers towards the intermediate arm.

29. A conveyor pan according to claim 1, in which the lower intermediate arm section and the base arm form and border a recess for positive support and acceptance of corresponding protrusions on a means for connecting the conveyor pans and a connecting bracket for an advancing beam.

* * * * *